ARTHUR ERNEST HENRY ELMER
INVENTOR
BY Reynolds & Christensen
ATTORNEYS

United States Patent Office 3,177,852
Patented Apr. 13, 1965

3,177,852
DRIVES SUITABLE FOR OPERATING FANS OF AUTOMOTIVE VEHICLES
Arthur E. H. Elmer, Harescombe, England, assignor to Dowty Hydraulic Units Limited, Ashchurch, near Tewkesbury, England, a British company
Filed Aug. 8, 1963, Ser. No. 300,748
Claims priority, application Great Britain, Aug. 15, 1962, 31,347/62
12 Claims. (Cl. 123—41.12)

This invention relates to drives suitable for operating fans of automotive vehicles where the fan, which is utilised for cooling the engine of the vehicle, is required automatically to be brought into operation, for example, when the temperature of the engine exceeds a predetermined value.

According to the invention a drive suitable for operating a fan of an automotive vehicle includes an expansible and contractible device arranged to effect connection and also disconnection of the fan to a driving membre through a clutch, the clutch being urged into its operative engaged condition to transmit the drive to the fan by change in effective length of the device beyond a predetermined amount consequent upon subjection of the device to a condition of such nature as to cause said change.

The condition may be a temperature condition and when this increases above a predetermined value, expansion of the device occurs to urge the clutch into its engaged condition.

Where the driving member is rotatable by an engine forming a part of an automotive vehicle, and where with the clutch engaged the fan driven therethrough is used to entrain a flow of cooling air through the radiator of the cooling system of the engine and over the engine itself, the device may be thermo-responsive, being in contact with the medium used in the cooling system.

The clutch and device may be arranged coaxially with respect to a pump used for circulating the medium within the cooling system.

Also, according to the invention, the device includes a member which is arranged to engage the components of the clutch through a cam and lever mechanism. This mechanism may be of a nature whereby a mechanical advantage is afforded in the operation of the clutch upon expension and contraction of the device.

The cam and lever mechanism may comprise a first cam and pivoted lever in operable engagement and in series with a second cam and pivoted lever, the first cam forming a part of, or being engaged by, the said member, and the second lever being connected for operation of the clutch.

The first lever may be formed integrally with the second cam.

The second cam and the surface of the second lever which engages with the second cam may be of knife-edge shape so that during relative movement of the cam surfaces, effectively, the clutch can only be positively engaged or positively disengaged.

Figure 1:
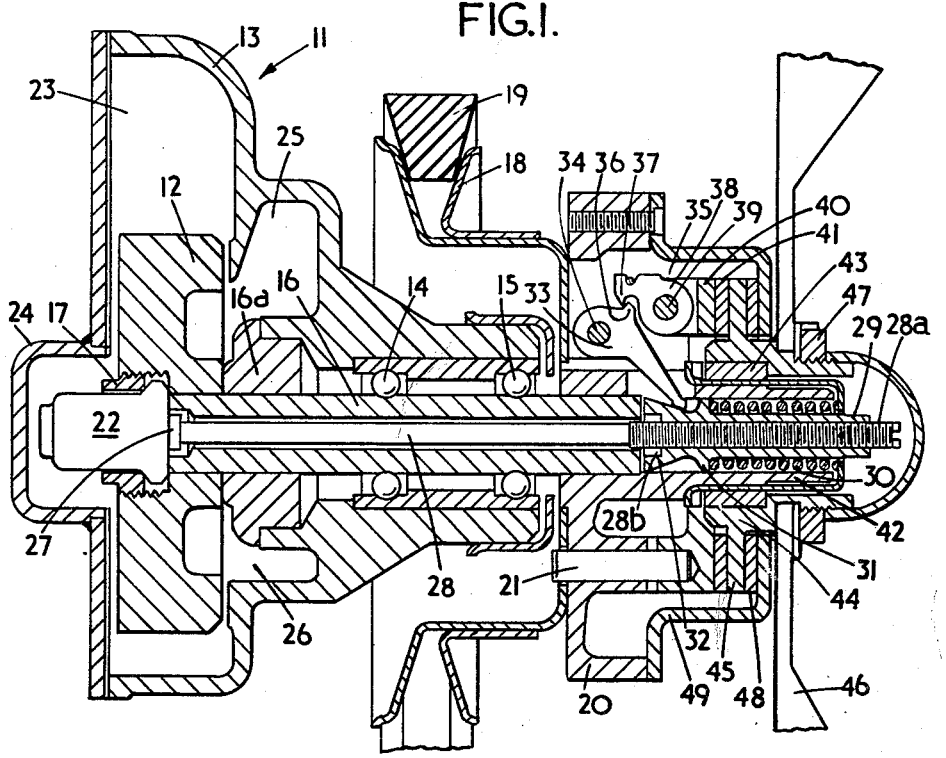
Figures 2, 3:
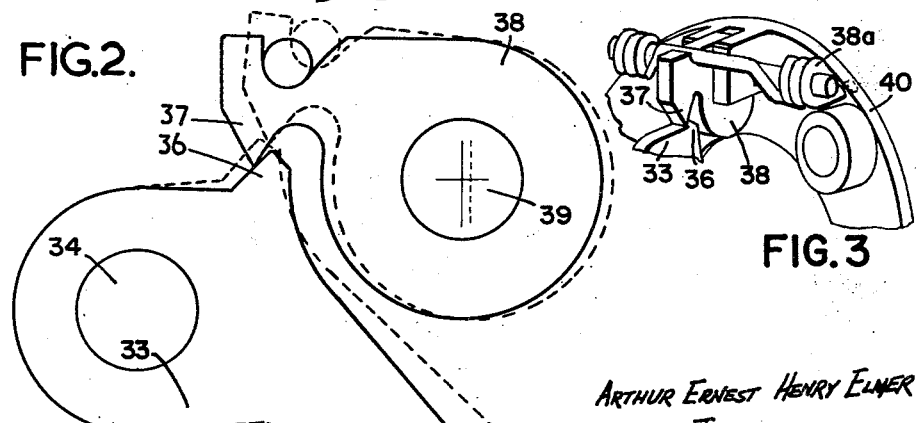
Figure 4:
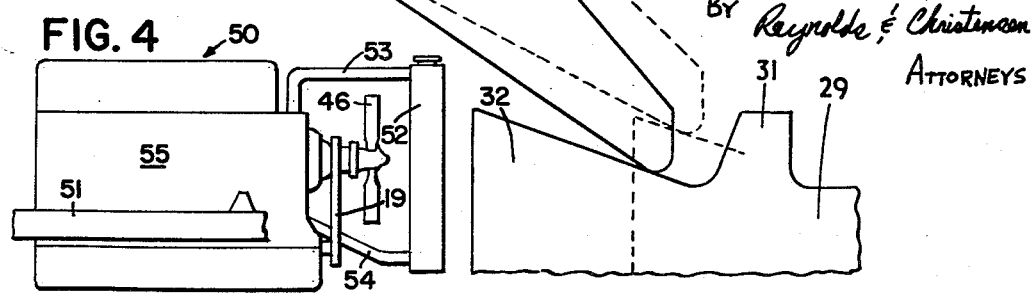

One embodiment of the invention will now be described with reference to the accompanying drawings, of which, FIGURE 1 shows in cross-section a drive for the cooling fan of the engine of an automotive vehicle, FIGURE 2 shows a part of the clutch operating mechanism included in the construction of FIGURE 1, FIGURE 3 is a perspective view in part of the clutch operating mechanism, and FIGURE 4 diagrammatically shows the engine and fan installation.

Referring to FIGURE 1 of the drawings, the fan drive generally indicated at 11 incorporates a centrifugal impeller 12 which constitutes a circulatory pump for the liquid cooling system of the engine of the automotive vehicle of which the fan drive forms a part.

The fan drive comprises a main casing 13 containing two ball bearings 14 and 15 in which is supported a shaft 16. The shaft 16 is provided with a seal assembly generally indicated at 16a and carries the impeller 12 at its end portion to the left in the drawing, the impeller being secured with respect to the shaft by means of a screw-threaded ring 17. Towards its other end portion, that is to the right in the drawing, the shaft 16 carries a pulley 18. This pulley is arranged to be driven in conventional manner from another pulley (not shown) mounted on the engine crank shaft, by means of a V-belt, a section of which is shown at 19. The pulley 18 is mounted upon the shaft 16 through the intermediary of a body 20 to which the pulley is secured by set bolts 21.

The shaft 16 is of hollow form and at its end portion remote from the mounting of the pulley 18 is provided with a thermo-responsive device 22. This device protrudes into a stepped chamber 23 which is formed within the casing 13 and closed by a cover plate 24 of appropriate shape.

Since the impeller 12 is used to circulate the medium contained within the cooling system of the engine with which the fan drive is associated, the chamber 23 is in communication with the cooling system, through inlet and outlet ports 25 and 26 respectively.

The thermo-responsive device 22 is a sealed unit which has a plunger head 27 which moves with respect to the main part of the device to the right in the drawing as the temperature to which the device is subjected increases, and conversely moves to the left when the temperature decreases. The plunger head 27 engages a rod member 28 which passes through the hollow interior of the shaft 16. At its end portion remote from the device 22 the rod member 28 engages a further rod member 28a which is screw-threaded. This rod member 28a carries an internally screw-threaded tubular member 29, a coil spring 30 which engages a flange 31 formed on the member 29, urging the member together with the two rod members 28 and 28a towards the left in the drawing. The end portion 32 of the member 29 closer to the device 22 is of frusto-conical form, this converging in the direction towards the coil spring 30. The end portion of the rod member 28a remote from the device 22 is provided with a screwdriver slot for adjustment of the position of the rod member 28a with respect to the tubular member 29, and thus for adjustment of the setting of the device 22. A nylon ring 28b for friction-locking of the rod member 28a is provided in the bore of the tubular member 29.

A pair of levers 33, one only of which is shown in the drawing, is pivotally mounted as at 34 within a pocket 35 formed in the body 20. Each lever 33 is provided with an upstanding portion 36 of substantially knife-edge form. This portion 36 is in engagement with an opposing upstanding portion 37 formed on a second lever 38. Each lever 38 is pivotally mounted as at 39 to a carrier 40, both carriers forming part of a single clutch plate 41.

Thus the portion 32 of the member 29 forms a first cam, while the upstanding portion 36 of the lever 33 forms a second cam.

The body 20 is provided with a core portion 42 having a hollow interior to carry the coil spring 30 and to allow the member 29 and rod 28a to pass therethrough. The core portion 42 carries a journal bearing 43 upon which is mounted a clutch sleeve 44. Formed integrally with the clutch sleeve is a clutch disc 45, the clutch sleeve extending forwardly of the assembly and carrying a cooling fan 46. The fan 46 is retained upon the clutch sleeve by means of a retaining nut 47.

The clutch plate 41 is intended in operation to engage the left-hand face in the drawing of the clutch disc 45 while a further clutch plate 48, which is carried by a stepped carrier 49 bolted to the body 20, is intended in operation to engage the right-hand face of the clutch disc 45.

Referring now to FIGURE 2, this shows an enlargement of the levers 33 and 38, of the cams 32 and 36 and also of the upstanding projection 37 formed upon the lever 38 with which the cam 36 engages.

The lever 38 is urged in an anti-clockwise direction, that is such that the upstanding projection 37 is urged into engagement with the cam 36, by a torsion spring 38a arranged co-axially with respect to the pivot 39.

In FIGURE 4 of the drawings the fan 46 is shown fitted to the engine 50 of the automotive vehicle, only a broken view of part of the chassis of the vehicle being shown at 51. The installation includes a conventional water cooling system comprising a radiator 52, and hoses 53 and 54 connecting the radiator to the cylinder block 55.

The operation of the fan drive will now be described.

The fan drive assembly, which is secured with respect to the cylinder block 55 of the engine, is driven by the engine crank shaft through the fan belt 19. The fan belt 19 rotates the pulley 18 which in turn rotates the block 20 and the shaft 16. Thus the impeller 12 is rotated so as to circulate the liquid medium contained in the cooling system of the engine.

When the temperature of the cooling medium is below a predetermined value, the plunger head 27 of the thermo-responsive device 22 is contracted with respect to the device so that the coil spring 30 urges the member 29 to its extreme left-hand position in the drawing so that the levers 33 are positioned as shown in the drawing. Under these circumstances the clutch plates 41 and 48 are disengaged from the clutch disc 45 and therefore the fan 46 is not rotated.

Upon increase of the temperature of the cooling medium towards the predetermined value, the plunger head 27 commences to extend from the main part of the device 22. In consequence the member 29 and cam 32 commence to be displaced to the right in the drawing against the effort of the coil spring 30. Although both levers 33 will be angularly displaced about their pivots 34, only the sense of the operation of the lever 33 shown in FIGURE 1 will be described. This lever will commence to rotate in an anti-clockwise direction about its pivot so that the cam 36 which is engaged by the upstanding portion 37 of the lever 38, will move so that the knife-edge of the upstanding portion 37 will climb the cam surface 36 towards its knife-edge, such movement storing energy in the torsion spring. As the predetermined temperature value of the cooling medium is reached and is detected by the device 22, the plunger head 27 will have extended sufficiently for the knife-edge of the upstanding portion 37 to have reached the knife-edge portion of the cam 36, whereupon it immediately toggles over the crest of this portion and slides down the right-hand face in the drawing of the cam 36 (as indicated in dotted detail in FIGURE 2), being urged by the stored energy in the torsion spring. In consequence the lever 38, together with its carrier 40, is displaced through the axial distance necessary to bring the clutch plates 41 and 48 into a state of engagement with the clutch disc 45.

In this way the clutch is now positively engaged and the fan 46 is rotated.

When the temperature of the cooling medium falls towards the predetermined value and with consequent contraction of the plunger head 27 with respect to the main part of the device 22, the cam 32 moves to the left in the drawing whereupon the lever 33 moves in a clockwise direction about its pivot 34. Thus, the knife-edge of the upstanding portion 37 climbs the right-hand face of the cam 36 storing energy in the torsion spring until at the predetermined temperature value this knife-edge reaches the knife-edge of the cam 36 and toggles over on to the left-hand face of the cam. As this occurs the lever 38 together with its pivot 39 and carrier 40, is displaced under the stored energy in the torsion spring to the left axially in the drawing through the distance necessary to positively disengage the clutch plates 41 and 48 from the clutch disc 45, whereupon the fan 46 ceases to be rotated through the fan drive.

Thus, a fan clutch operating mechanism is provided in which the thermo-responsive device directly effects engagement and disengagement of the clutch in accordance with temperature and in which the power for effecting such operation is derived solely from the heating and cooling effect of the cooling medium.

Also, unnecessary operation of the engine cooling fan under relatively cool engine-running conditions does not occur, so that power absorption by the fan under such conditions is avoided.

In an alternative embodiment of the invention the device is not thermo-responsive but is instead pressure-responsive so that the operation of the clutch in the drive of the invention is dependent upon the magnitude of a pressure signal, gaseous or fluid, applied to the device.

I claim as my invention:

1. In combination, rotatable driven and driving members forming a clutch, rotatable drive means operating to rotate the driving member, first and second cams rotatably mounted on the drive means and the driving member, respectively, and having cam surfaces thereon which rotate in overlapping paths, resilient means urging the second cam to rotate its cam surface into contact with the cam surface on the first cam, a clutch actuator, means responsive to the operation of the clutch actuator to rotate the first cam in the direction of bias on the second cam, with the consequent effect of rotating the second cam in the direction opposing such bias, and means operable to engage the driving member with the driven member in response to rotation of the second cam in the direction of bias after the crests of the cam surfaces toggle over one another.

2. The combination according to claim 1 wherein the closing portion of the cam surface on the first cam is so relatively inclined across the path of the cam surface on the second cam that the second cam is constrained to urge the driving member into engagement with the driven member as the second cam is rotated in the direction of bias after the crests of the cam surfaces toggle over one another.

3. The combination according to claim 1 wherein the first cam rotating means include a reciprocable cam which is displaced by the clutch actuator, and a lever on the first cam which is responsive to the displacement of the reciprocable cam to rotate the first cam in the direction of bias on the second cam.

4. The combination according to claim 1 wherein each of the cam surfaces has a substantially knife-edge form.

5. The combination according to claim 1 wherein the resilient means include a torsion spring.

6. The combination according to claim 1 wherein the driven member has a fan thereon.

7. In combination, rotatable driven and driving members forming a clutch, rotatable drive means operating to rotate the driving member, first and second cams rotatably mounted on the drive means and the driving member, respectively, and having cam surfaces thereon which rotate in overlapping paths, resilient means urging the second cam to rotate its cam surface into contact with the cam surface on the first cam, a cooling system, means responsive to a change in an operating condition of the coolant in the cooling system, to rotate the first cam in the direction of bias on the second cam, with the consequent effect of rotating the second cam in the direction opposing such bias, and means operable to engage the driving member with the driven member in response to rotation of the second cam in the direction of bias after the change in the operating condition of the coolant reaches a point at which the crests of the cam surfaces toggle over one another.

8. The combination according to claim 7 wherein there is a radiator in the cooling system and the driven member has a fan thereon which is positioned to generate air flow through the radiator.

9. The combination according to claim 7 wherein the first cam rotating means is responsive to a change in the temperature of the coolant.

10. The combination according to claim 7 wherein the first cam rotating means include heat-sensitive means which are responsive to an increase in the temperature of the coolant to expand along an axis thereof, a reciprocable cam which is displaced by the expansion of the heat sensitive means, and a lever on the first cam which is responsive to the displacement of the reciprocable cam to rotate the first cam in the direction of bias on the second cam.

11. In the engine cooling system of a vehicle, a radiator, a pump operating to circulate coolant through the radiator, rotatable driven and driving members forming a clutch, rotatable clutch drive means driven by the engine and operating to rotate the driving member, first and second cams rotatably mounted on the clutch drive means and the driving member, respectively, and having cam surfaces thereon which rotate in overlapping paths, resilient means urging the second cam to rotate its cam surface into contact with the cam surface on the first cam, heat sensitive means which are responsive to an increase in the temperature of the coolant in the pump chamber to expand along an axis thereof, a reciprocable cam which is displaced by the expansion of the heat sensitive means, and a lever on the first cam which is responsive to the displacement of the reciprocable cam to rotate the first cam in the direction of bias on the second cam, with the consequent effect of rotating the second cam in the direcion opposing such bias, the closing portion of the cam surface on the first cam being so relatively inclined across the path of the cam surface on the second cam that the second cam is constrained to urge the driving member into engagement with the driven member as the second cam is rotated in the direction of bias after the temperature in the coolant increases to a point at which the crests of the cam surfaces toggle over one another, and said driven member having a fan thereon which is positioned to generate air flow through the radiator.

12. An engine cooling system according to claim 11 wherein the pump and the fan are disposed on a common axis of rotation, and the heat-sensitive means, the reciprocable cam, and the clutch members are all interposed between the pump and the fan on such rotational axis.

References Cited by the Examiner
UNITED STATES PATENTS

| | | | |
|---|---|---|---|
| 2,438,161 | 3/48 | Greenlee. | |
| 2,652,816 | 9/53 | Dodge | 123—41.12 |
| 2,786,456 | 3/57 | Heiss | 123—41.12 |
| 2,879,755 | 3/59 | Weir | 123—41.12 |

RICHARD B. WILKINSON, *Primary Examiner.*

KARL J. ALBRECHT, *Examiner.*